(12) United States Patent
Longaker (10) Patent No.: US 6,226,601 B1
(45) Date of Patent: *May 1, 2001

(54) SEISMIC SURVEY SYSTEM

(75) Inventor: Harold L. Longaker, Houston, TX (US)

(73) Assignee: Trimble Navigation Limited, Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,019

(22) Filed: May 15, 1998

(51) Int. Cl.$^7$ .................................................. G06F 19/00
(52) U.S. Cl. .......................... 702/79; 702/16; 702/14; 706/928; 706/929
(58) Field of Search ................... 702/79, 6, 7, 9, 702/11, 12, 13, 14, 17, 18, 16; 367/14, 50; 455/467, 466, 437, 441, 443; 706/928, 929

(56) References Cited

U.S. PATENT DOCUMENTS

| | | | |
|---|---|---|---|
| 4,128,740 | 12/1978 | Graziano | 179/2 EB |
| 4,509,170 | 4/1985 | Hollinger et al. | 370/85 |
| 4,583,206 | 4/1986 | Rialan et al. | 367/78 |
| 4,628,494 | 12/1986 | Rialan et al. | 307/79 |
| 4,712,199 | 12/1987 | Rialan et al. | 367/76 |
| 4,733,747 | 3/1988 | McCormack | 181/107 |
| 4,815,044 | 3/1989 | Deconinck et al. | 367/77 |
| 4,905,205 | 2/1990 | Rialan | 367/77 |
| 4,908,803 | 3/1990 | Rialan | 367/77 |
| 4,979,152 | 12/1990 | Rialan et al. | 367/77 |
| 5,073,971 | 12/1991 | Schaeffer | 455/33 |
| 5,077,698 | 12/1991 | Beaudecel | 367/79 |
| 5,089,995 | 2/1992 | Hackett | 367/76 |
| 5,131,489 | 7/1992 | Hackett | 181/112 |
| 5,231,251 | 7/1993 | Hackett | 181/112 |
| 5,243,469 | 9/1993 | Hackett et al. | 360/6 |
| 5,276,655 | 1/1994 | Rialan et al. | 367/77 |
| 5,351,244 | 9/1994 | Rialan et al. | 371/2.1 |
| 5,485,631 | 1/1996 | Bruckert | 455/33.3 |
| 5,510,797 | 4/1996 | Abraham et al. | 342/352 |
| 5,515,378 | 5/1996 | Roy, III et al. | 370/95.1 |
| 5,548,562 | 8/1996 | Helgerud et al. | 367/14 |
| 5,550,787 | 8/1996 | Rialan et al. | 367/44 |
| 5,563,847 | 10/1996 | Grouffal et al. | 367/65 |
| 5,603,089 | 2/1997 | Searle et al. | 455/53.1 |
| 5,623,455 | 4/1997 | Norris | 367/76 |
| 5,627,798 | 5/1997 | Siems et al. | 367/76 |
| 5,646,630 * | 7/1997 | Sheynblat et al. | 342/357 |
| 5,649,286 | 7/1997 | Frerking | 455/435 |
| 5,649,292 | 7/1997 | Doner | 455/447 |
| 5,724,241 | 3/1998 | Wood et al. | 364/421 |
| 5,844,888 * | 12/1998 | Markkula, Jr. et al. | 370/255 |
| 5,890,067 * | 3/1999 | Chang et al. | 455/446 |
| 5,940,777 * | 8/1999 | Keskes | 702/16 |

OTHER PUBLICATIONS

William C. Y. Lee, "Mobile Cellular Telecommunications System", *Library of Congress Cataloging–in–Publication Data*, pp. 49–59, 1989.

* cited by examiner

*Primary Examiner*—Kamini Shah
(74) *Attorney, Agent, or Firm*—Blakely, Sokoloff, Taylor & Zafman LLP (57) ABSTRACT

A wireless seismic survey system is structured as a hierarchy of cell network layers, each higher level cell network layer covering a bigger area than a lower level cell network layer and receiving data from the lower level cell network layer. This hierarchical structure functions to concentrate collected data to a level that can be communicated to a central collection point, either through wireless, cable or other media. By defining cells to cover predetermined areas, transmission frequencies and/or transmission time slots or codes can be reused by cells sufficiently spaced apart to avoid co-channel interference, thereby increasing the amount of usable bandwidth.

20 Claims, 10 Drawing Sheets

SEISMIC SURVEY SYSTEM

BACKGROUND OF THE INVENTION

1. Field of the Invention

The present invention relates to a seismic survey system. More particularly, the present invention relates to a wireless land seismic survey system.

2. Art Background

Land seismic survey operations typically require placing hundreds to thousands of geophones at locations about the area to be surveyed. When a seismic source is generated, either as an impulse caused by dynamite or a sweep caused by a Vibroseis truck, the seismic reflections are detected by the geophones. The measurement data generated by all the geophones is then transmitted to a central recording system.

The amount of data transmitted to the central recording system may be considerable. For example a 20-second Vibroseis sweep can generate on the order of 250,000 bits of data. When there are 1,000 geophone channels in use, this translates to 250,000,000 bits of data every 20 seconds or an effective data rate of 12.5 megabits per second.

Increasing the number of geophone channels increases the amount of data to be transferred to the central recording system. Many current seismic survey projects have more than 1,000 geophones active at any one time and the requirements for more channels is increasing. In a few years time it is expected that channel counts as high as 10,000 will not be uncommon.

Most seismic systems utilize cables to transfer the seismic data from the geophones to the central recording system. The cables are typically laid out in parallel with a "cross-connect" cable to collect the data from the several parallel cables. With very high channel counts there can be "cross-connect" cables cross-connecting lower level "cross-connect" cables. When there are thousands of channels for a seismic survey project the amount of cable that has to be placed on the ground is considerable. For very large projects this can amount to 50 miles or more of cable 50 miles of cable weighs on the order of 40 tons. Consequently laying out this amount of cable is expensive and difficult. It is equally expensive and difficult to pick up upon completion of the seismic survey project.

In addition to the physical effort required to lay out the cable there are other problems with cable operations. In some areas rodents and other animals chew through the cables and the ensuing breaks have to be located and repaired. Lightning strikes can cause sever cable damage which can cause problems requiring several days to isolate and repair.

Some cable problems are obvious and are simple to identify and fix. A cable cut in two is such an example. Sometimes the problems are intermittent. These problems can take days to locate and repair. Each day a seismic survey crew is occupied trying to identify and repair cable problems represents an economic loss to the project.

Some seismic survey systems use radio links to collect geophone data. With radios in lieu of cables there is no cable layout required and obstacles to cable operations such as swamps are not a problem. However, as currently implemented, radio-based systems are very constrained as to the number of geophones or channels they can support. Typically there is sufficient bandwidth available to support only a few hundred channels.

What is needed is a radio-based system for eliminating the problems associated with cable-based systems and which is not constrained as to the number of channels that can be supported.

SUMMARY OF THE INVENTION

A wireless seismic survey system is described that eliminates the problems associated with a cable-based system and overcomes the limitations of prior art radio-based systems. The system employs a technique of reusing transmission frequencies (FDMA), times (TDMA) and/or codes (CDMA) in different geographic locations. The system is structured as a hierarchy of cell network levels with each higher level having progressively larger cells. A cell of a higher level network communicates with multiple cells of the next lower level and there can be several cell levels. Using this technique, higher level cells concentrate data received from the lower level cells. This hierarchical structure can function to concentrate the data to a level where there is a single central collection point.

BRIEF DESCRIPTION OF THE DRAWINGS

The objects, features and advantages of the present invention will be apparent from the following detailed description and its accompanying drawings in which.

DETAILED DESCRIPTION

The system and method of the present invention utilize a multiple-level, layered cellular topology. More particularly, the system and method of the present invention provide for two or more cellular layers with each layer configured to have larger cells than the layer below and consequently concentrating the data from the layer below. As will become apparent from the following description, this cellular pyramidal layering enables the efficiencies of transmission frequency/time/code reuse and the concentrating effect of the ensuing higher layers. Thus, by utilizing an hierarchical structure of sufficient layers, data transmitted within the system eventually becomes concentrated at a single point.

In the following description, for purposes of explanation, numerous details are set forth in order to provide a thorough understanding of the present invention. However, it will be apparent to one of ordinary skill in the art that these specific details are not required in order to practice the present invention. In other instances, well-known electrical structures and circuits are shown in block diagram form in order not to obscure the present invention unnecessarily.

The system of the present invention enables the collection of data from large numbers of measurement devices such as geophones used in seismic data collection. The system uses cellular technology in which a cell defines an area of usage of a certain transmission frequency, in a frequency division multiple access (FDMA) system, a transmission time slot in a time division multiple access (TDMA) system, or a transmission code in a code division multiple access (CDMA) system.

The cellular telephone system is based on the premise that if a first cell is far enough distant from a second cell, the first cell can use the same set of transmission frequencies, times or codes of the second cell without causing co-channel interference. These cellular techniques enable the reuse of transmission frequencies, times and/or codes over different geographic locations. Thus, even though each cell has a finite bandwidth, the sum of all the cells, when frequency, time, or code reuse is employed, provides essentially infinite bandwidth.

The typical cellular telephone network design does not provide for a wireless linking of the hubs for each cell site together to enable the concentration of the data carried within the network. In conventional cellular telephone networks the links between the sites are accomplished with the use of copper or fiber media.

If a wireless seismic system were to utilize the methodologies of conventional cellular telephone networks, the geophones would be able to provide the collected measurement data to the spatially diverse cell hubs with a wireless media. The task of getting the data from the spatially diverse cell hubs to a central recording system would still have to be accomplished using cables. Consequently, a conventional cellular network scheme would have limited value.

The system of the present invention overcomes these disadvantages by layering the cells. At the lowest level or layer, a central point or hub collects data from the measurement devices located within a corresponding cell. Each hub is associated with a higher level hub to which data is transmitted to achieve a higher level of concentration of data. By implementing at least two layers in a cellular topology, the existing problems associated with cable-based seismic survey systems are avoided. The concentration of data can continue via additional layers of cells or through transmission of data to the central collection site via a minimum set of cables.

Figure 1:
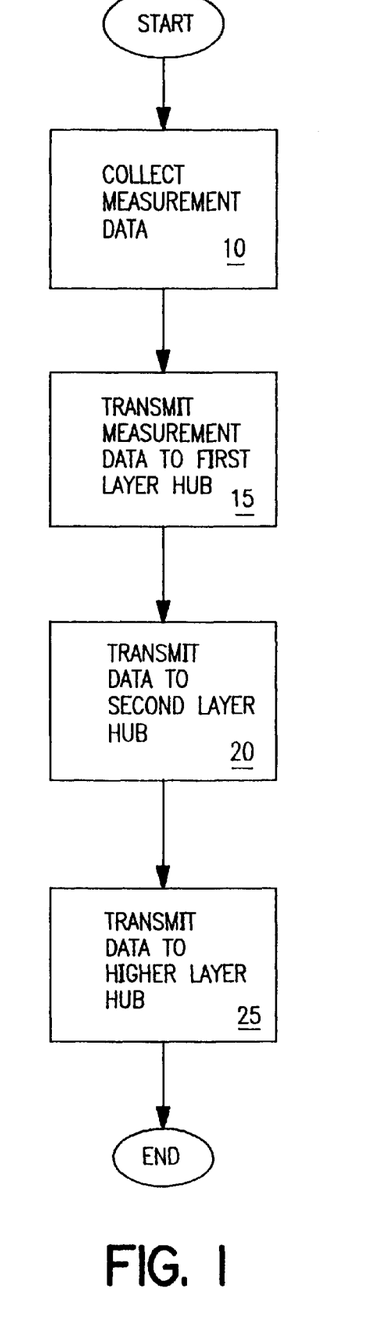
FIG. 1 is a flow chart illustrating one embodiment of the method of the present invention.

The process is now described with reference to FIG. 1. At step 10, the measurement data is collected at the measurement devices. In the present embodiment, geophones are used, although it is contemplated that a variety of measurement devices (e.g., magnetometers, hydrophones, temperature sensors, humidity sensors, soil/vegetation sensors, optical detectors/reflectors, etc.) can be used for seismic and/or other applications. At step 15, the measurement devices or a local collection point of a group of measurement devices transmit their data to a first layer hub. The data may be collected in real-time or stored for later transmission. At step 20, the first layer hubs transmits the data to a second layer hub.

At step 25, the process of transmitting the data to higher layer hubs continues until a desired level of data consolidation is reached. The desired level of consolidation may be at the point where all data is consolidated at the central data collection point or at some plurality of points which are connected to the central data collection point through some other media (e.g., cable, infrared, another radio band or optical media).

Figure 2:
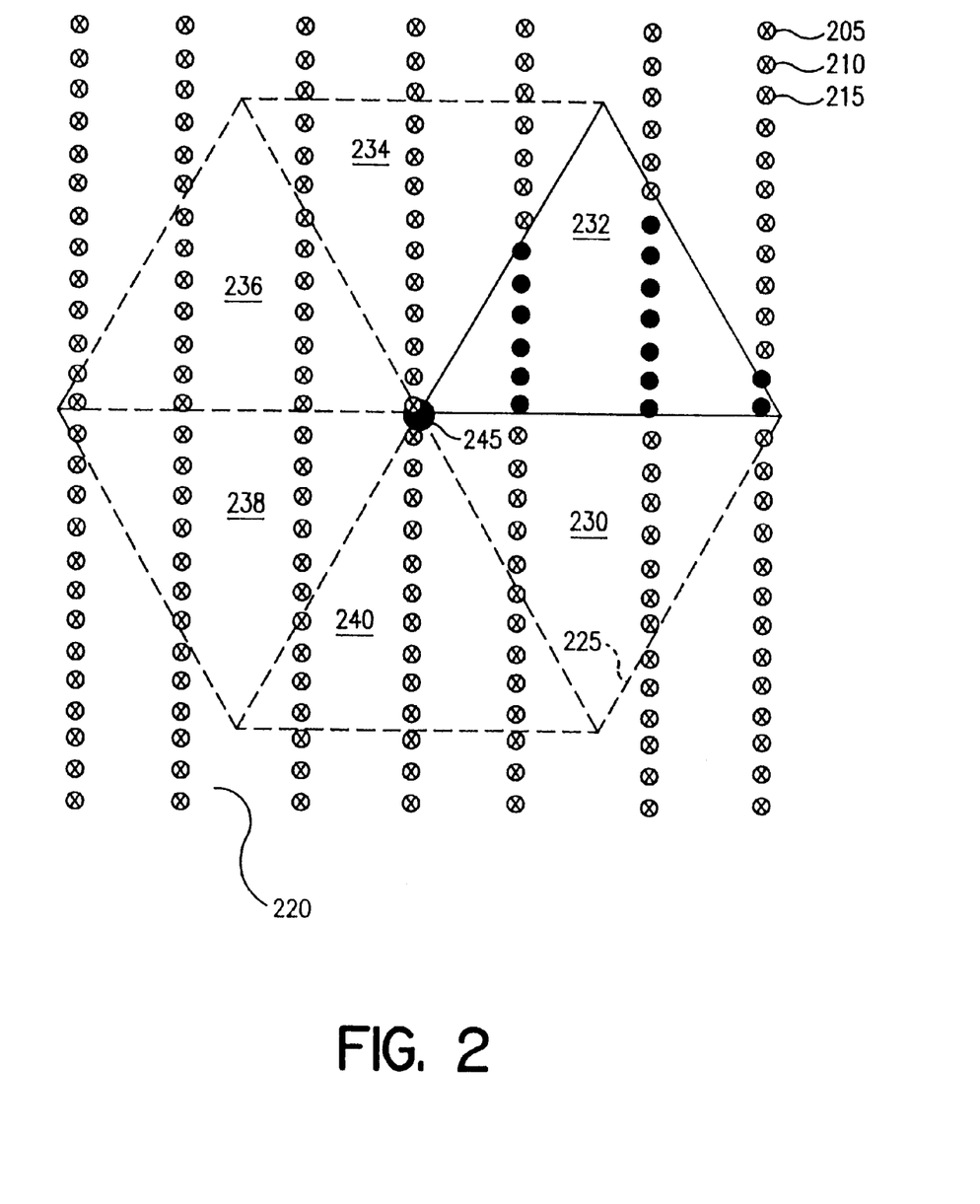
FIG. 2 illustrates an exemplary cell of a bottom or first layer.

FIG. 2 is illustrative of one cell of a bottom layer or first layer. Geophone arrays or channels, e.g., 205, 210, 215, are placed spatially apart in the area 220 to be surveyed. Area 220 represents a portion of the total area to be surveyed. Each geophone array may consist of one or more connected geophone devices, with at least one device of the array containing a transmitter to transmit the data of the array in accordance with the teachings of the present invention.

Hexagonal shaped cells 225, also referred to as Level 1 cells, are defined. Each Level 1 cell contains six sectors 230, 232, 234, 236, 238, 240. A Level 1 hub 245 is placed in the center of the Level 1 cell 225. The geophone devices of the arrays transmit their collected data using 6 different transmission frequencies, time slots and/or codes depending upon the sector 230, 234, 234, 236, 238, 240, the transmitting geophone device is located in, with no two geophone devices in the same sector using the same transmission frequency, time or code. Each sector is allotted a subset of the frequencies, times and/or codes assigned to the sector's cell and, further, each geophone device in a sector is assigned a lower level subset of the frequencies, times and/or codes.

Figure 3:
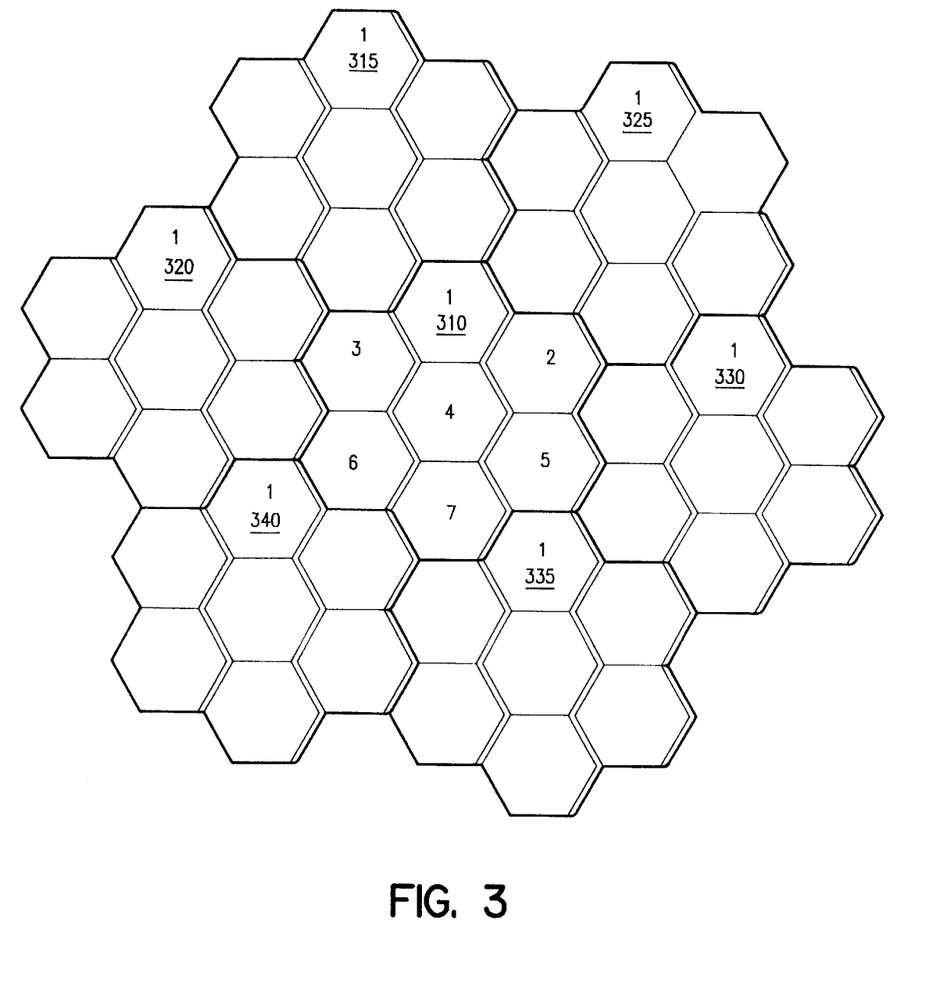
FIG. 3 is an example of a reuse pattern.

One concern in developing a cellular scheme is keeping the level of cochannel interference to an acceptable level. FIG. 3 is a cellular reuse scheme that also may be used for a conventional cellular telephone network. In this scheme a reuse pattern consists of 7 cells. A mobile unit in cell number 1 310 can communicate with its hub (located at the center of cell number 1) while other mobile units can use the same frequency at the same time while they are in other cell number 1s 315, 320, 325, 330, 335, 340 without causing unacceptable cochannel interference. Such a scheme permits reuse of transmission frequencies, times, and/or codes over large geographic areas.

The conventional cellular telephone environment is such that path loss is proportional to the fourth power of distance. This is due to such factors as multipath from buildings and the fact that mobile cellular telephone units are, as the name implies, usually moving. For the present invention, however, line of right (LOS) conditions generally will be met, the transmitting units (e.g., geophones) will not be moving and multipath will be minimal. For these reasons, using a path loss proportional to the second power of distance is appropriate and conservative. A consequence of using this path loss model is that more cells have to be used in the reuse pattern. More cells translate to a less efficient use of bandwidth and to a higher ratio of cells to geophone channels.

Figure 4:
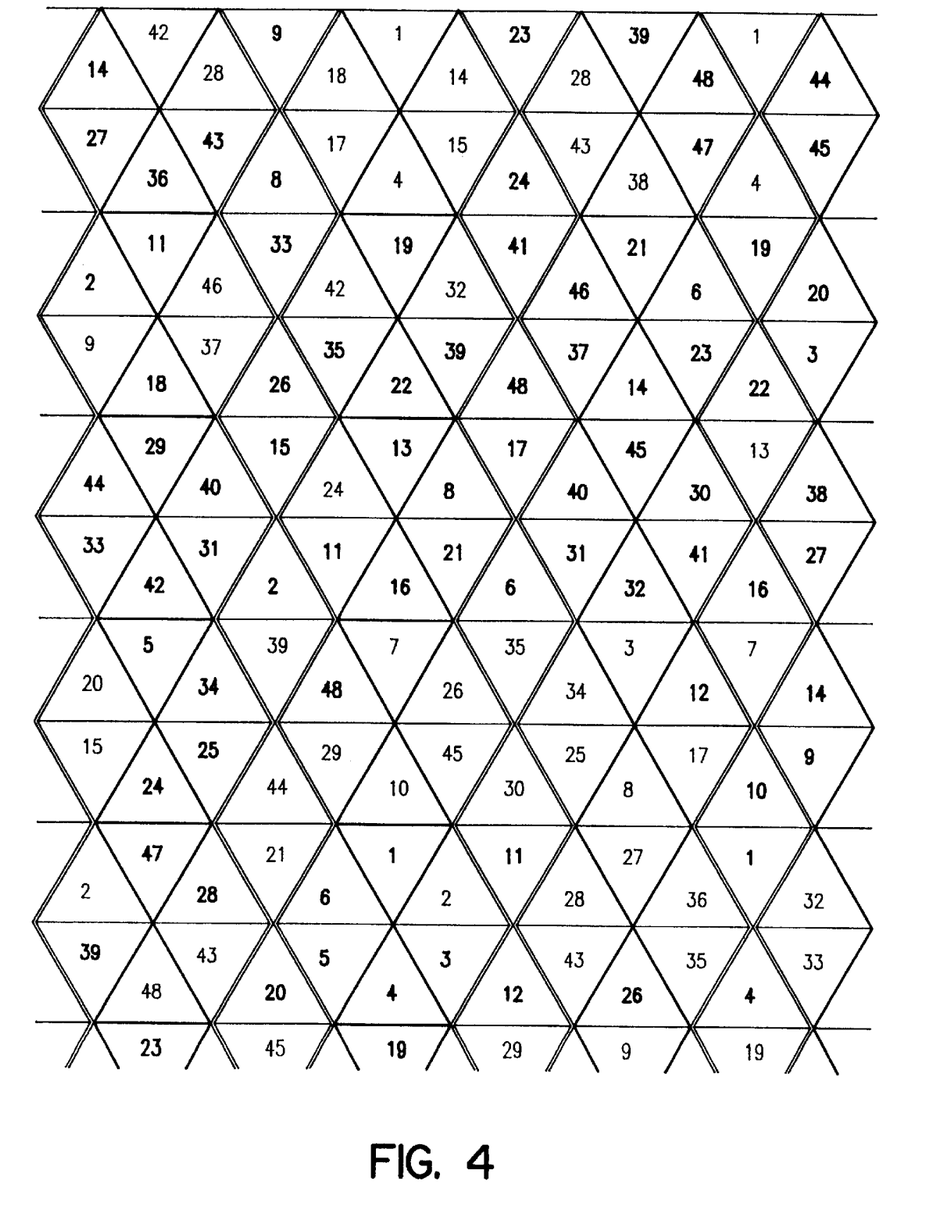
FIG. 4 illustrates cells of a first level or a Level 1 of one embodiment of the hierarchical network of the present invention.

A common technique used in cellular methodology is the use of sectored antennas. Sectored antennas help increase the efficiency of use of bandwidth and will help decrease the ratio of cells to geophone channels. This in effect increases the concentration of data on a per cell basis. When sectored antennas are used, each cell can be divided into sectors with each sector having a unique time, frequency and/or code assignment. Such an arrangement is shown in FIG. 4 where 6-sectored antennas are used at each hub. Here there is a repeat pattern of 48 sectors.

In this example any transmitter with an omnidirectional antenna can communicate with its respective hub without causing co-channel interference to other transmitters operating in other like numbered sectors. This technique densifies the use of the radio spectrum.

Figure 5:
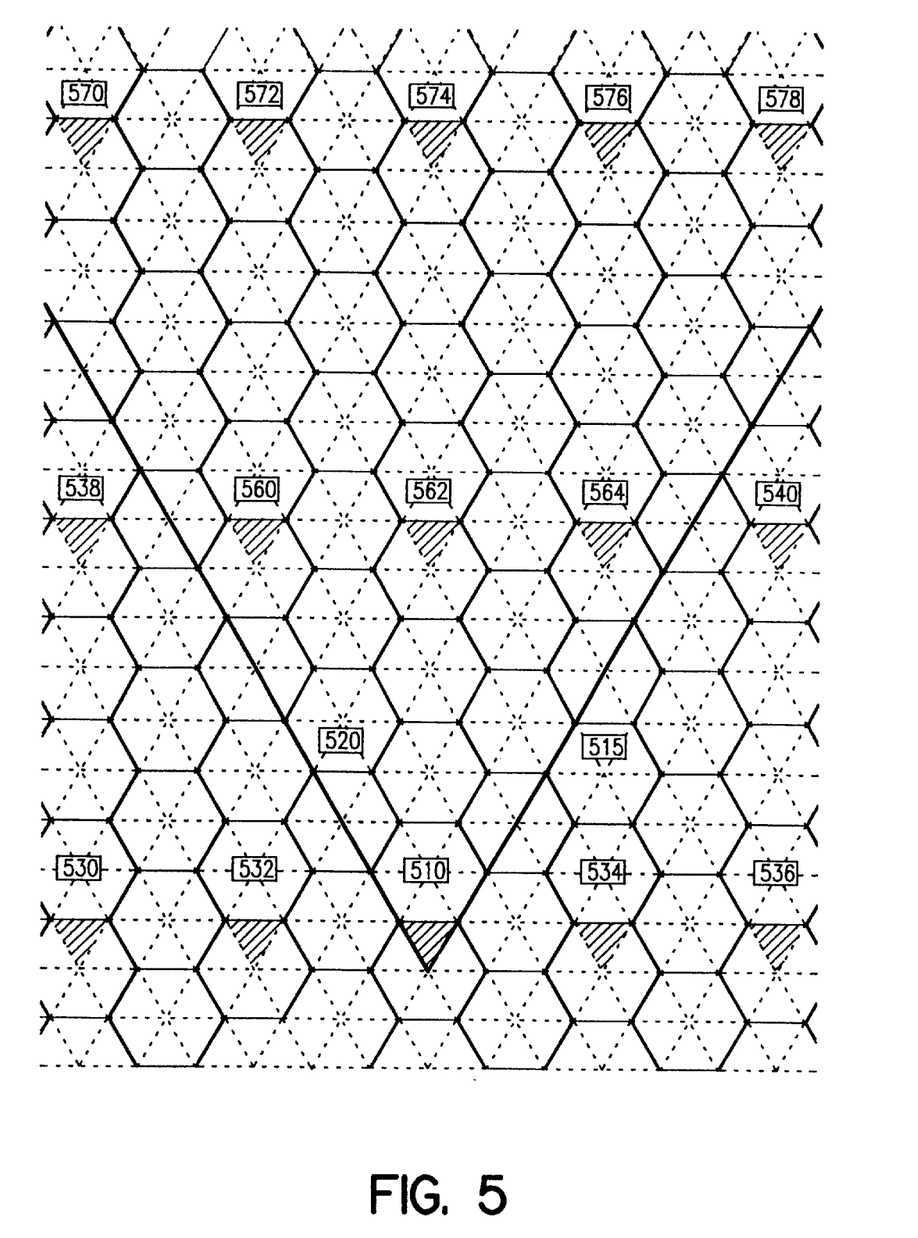
FIG. 5 illustrates one example of the location of cochannel interferers at a Level 1 cell of a hierarchical network in accordance with an embodiment of the present invention.

FIG. 5 illustrates the cochannel interference as seen at one sector for the cellular scheme presented in FIG. 4. Sector

510 has a sectored antenna whose azimuth limits are defined by 515 and 520. Other like numbered sectors such as 530, 532, 534, 536, 538 and 540 are outside the azimuth limits and transmitters in those sectors will not cause cochannel interference. The sectors within the azimuth limits, 560, 562, 564, 570, 572, 574, 576 and 578 all represent some level of cochannel interference. The Channel to Interference (C/I) level at 510, when just 560, 562 and 564 are considered, is approximately 14.3 dB. When 570, 572, 574, 576, and 578 are considered, the C/I level is reduced to approximately 12.6 dB.

If the path loss is greater than the second power of distance then the C/I level will increase. If the C/I level increases sufficiently, the number of sectors in the reuse pattern could be reduced, thus increasing the efficiency of using the available bandwidth. Conversely if a C/I level of 12.6 dB is not sufficient to maintain an adequate bit error rate, the number of sectors in the repeat pattern may be increased.

Using these bandwidth conversion techniques, a Layer 1 cell implementation may be developed as follows. Consider that for a typical seismic system, a worse case data rate requirement would occur if a Vibroseis truck were continuously sweeping. In such a case, the expected data rate being generated by each geophone array would be on the order of 12,000 bps. This assumes each sample comprises 24 bits and a 500 Hz sampling rate is used. In a system where there are 4 geophone groups per sector and 6 sectors per cell there would be 24 groups per cell and a data requirement of:

12,000 bps/group×4groups/sector×6sectors/cell×8cells=2.304 mbps

If data compression were employed at the geophone groups, such as that associated with stacking and correlation, then a compression ratio of 4:1 would enable a data rate of 2.304 mbps to support 16 groups per sector. Also if the project were using dynamite instead of a Vibroseis truck, where there is about a 10-fold reduction in data rate requirements, then 2.304 mbps would support 40 groups per sector.

The above example shows how the present invention enables the wireless transmission of data to a Layer 1 hub. This one step of course reduces the amount of cable that would otherwise be required, but there would still remain a considerable amount of cable to be laid to get the data from the Layer 1 hub to the central recorder.

Figure 6:
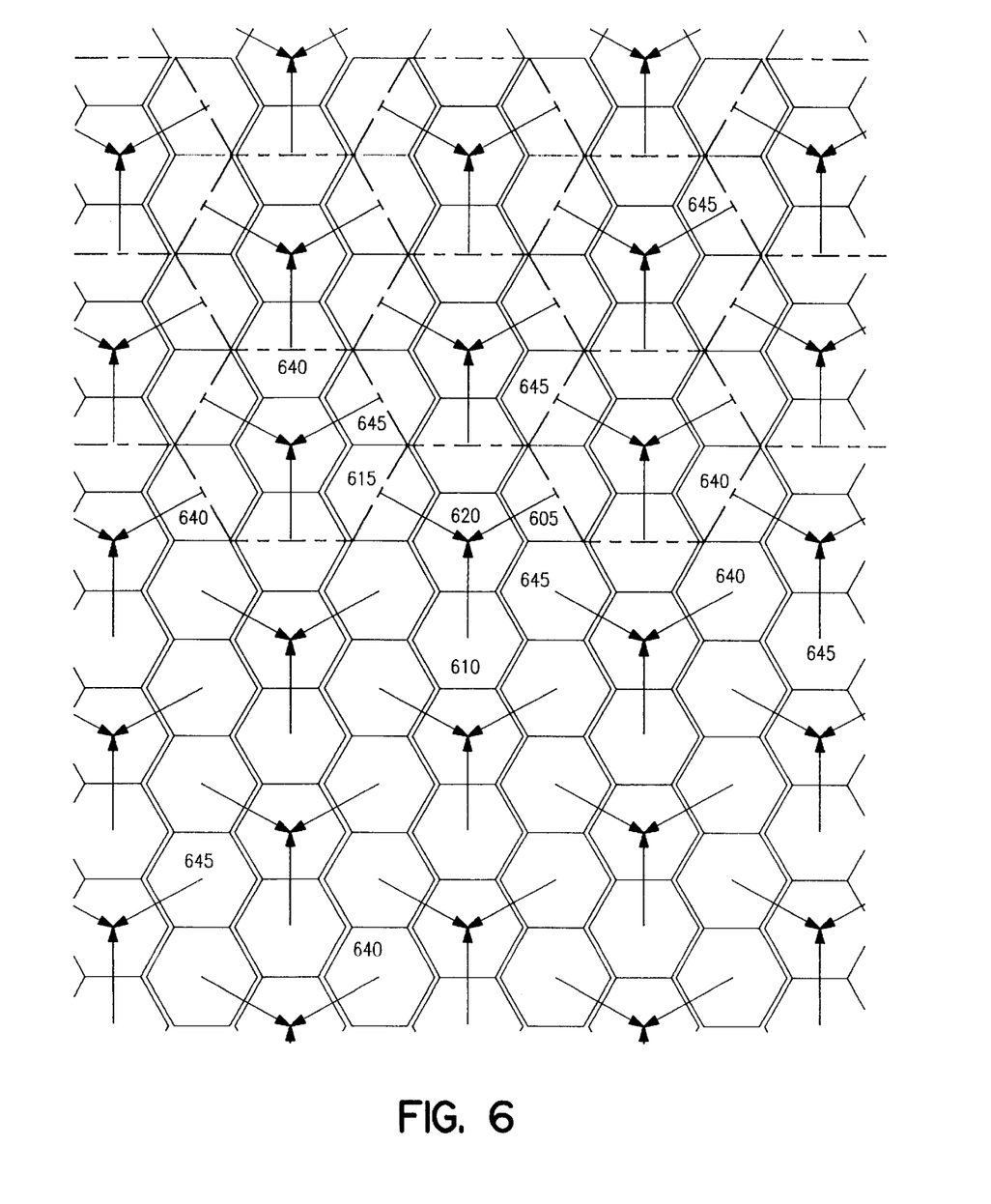
FIG. 6 illustrates one embodiment of Layer 2 cells of a hierarchical network in accordance with an embodiment of the present invention.

FIG. 6 illustrates one embodiment of a Layer 2 cell, which is superposed or overlaid on the Layer 1 cell (e.g., as shown in FIG. 4 and FIG. 5). For clarity, only Layer 1 is shown in the bottom half of the drawing, while the overlayment of Layer 2 over Layer 1 is shown in the top half of the drawing. In the illustrated embodiment, three Layer 1 hubs 605, 610, 615 transmit data to a fourth Layer 1 hub 620. The fourth Layer 1 hub also functions as a Layer 2 hub. In order to allow transmission frequencies, times and/or codes reuse, each of the three axes require two time slots, two frequencies or two codes for a total of 6 time slots, frequencies or codes at this layer.

Preferably all the antennas at this layer are directional. Using directional antennas, as shown in FIG. 6 with solid and dotted lines, the spacing between transmitting antennas along a common axis is set to every other cell in order to meet or exceed the frequency, time and or code reuse distance and avoid co-channel interference. Thus, for example, a first set of antenna transmissions, along a first axis, as noted in FIG. 6 by arrows 640 and depicted by a solid line, are transmitted at a first frequency or time slot or code and a second set of antenna transmissions, along the first axis, as noted in FIG. 6 by arrows 645 and denoted by a dotted line, are transmitted at a second frequency or time slot or code. Two frequencies or time slots or codes are similarly used for the other two axes. With directional antennas, transmitters on one axis will not interfere with those on other axes.

Figure 7:
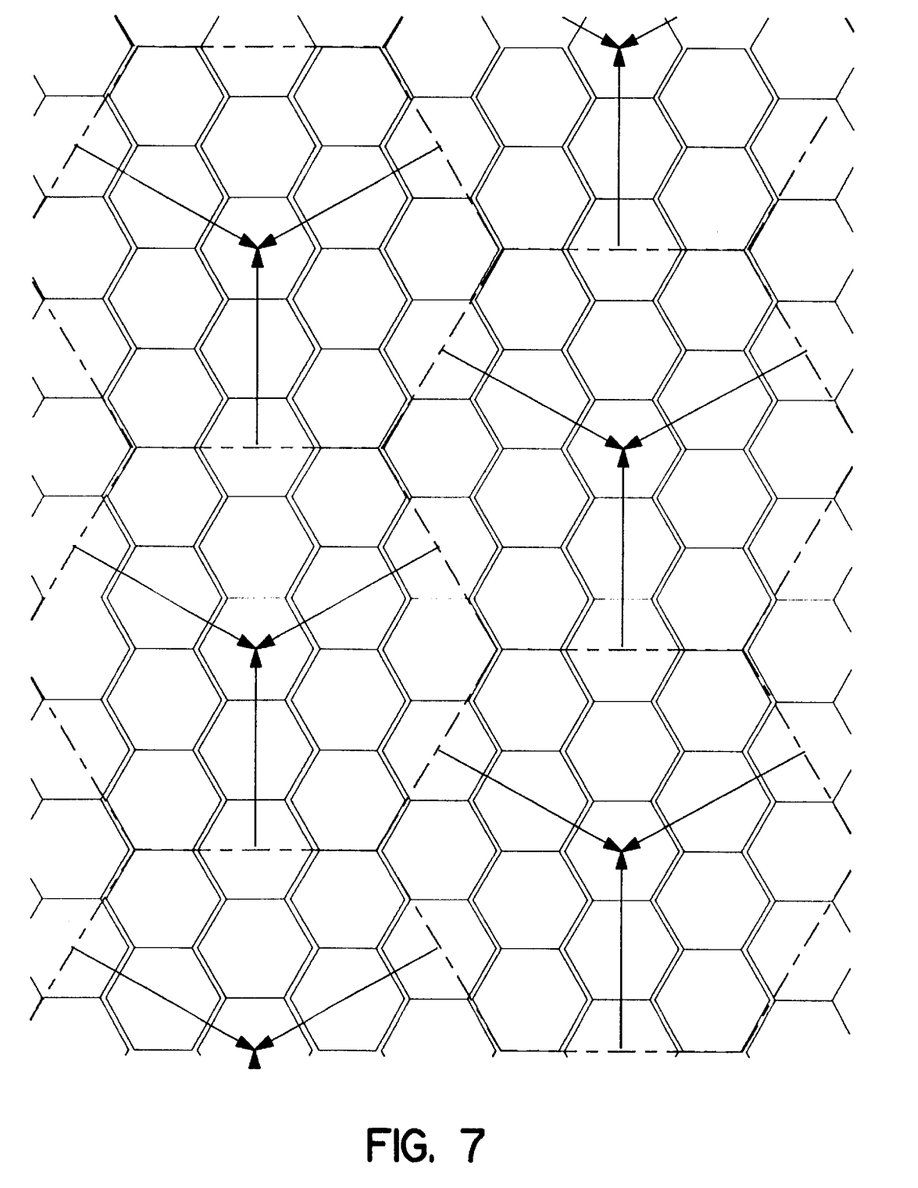
FIG. 7 illustrates one embodiment of Layer 3 cells of a hierarchical network in accordance with an embodiment of the present invention.
Figure 8:
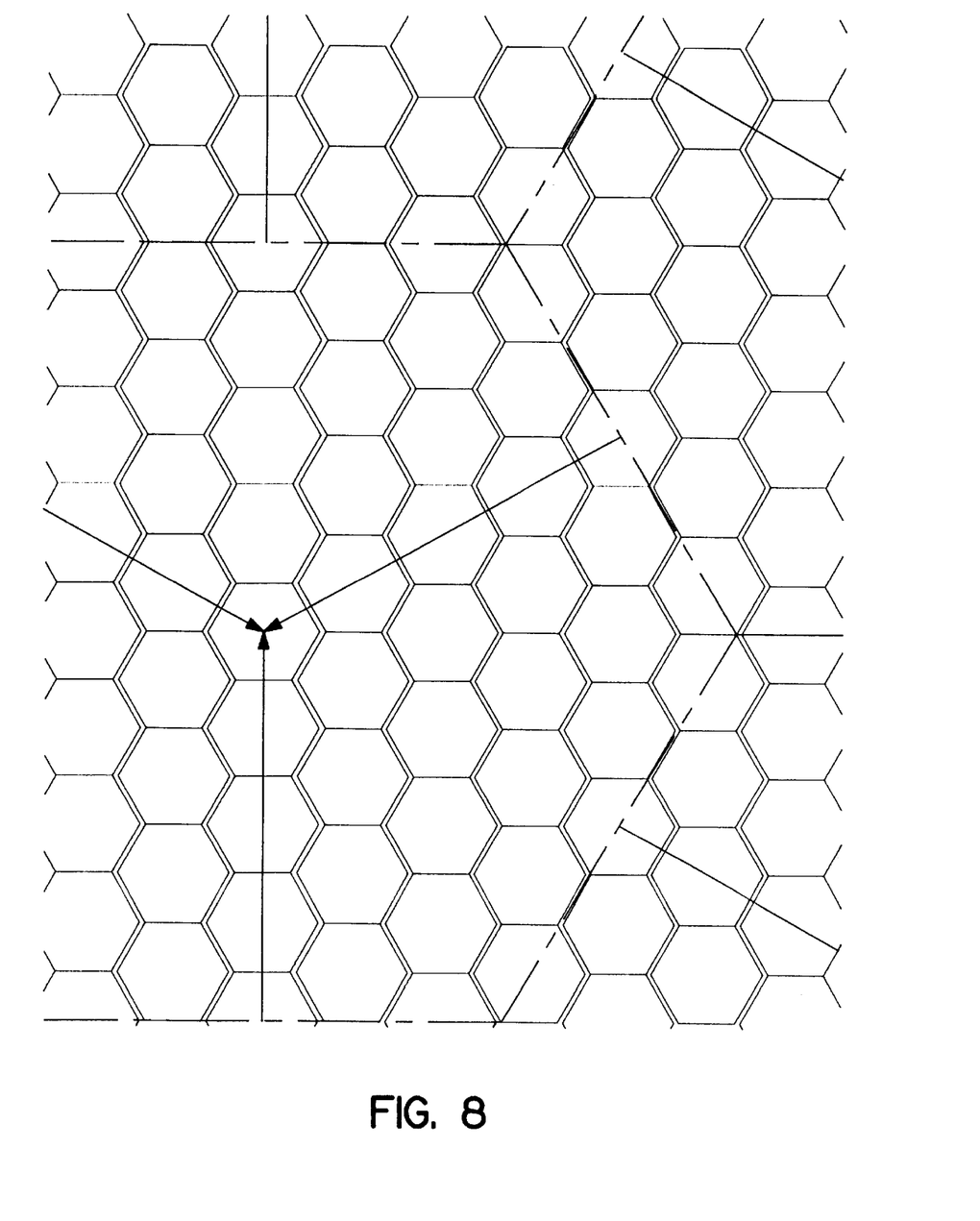
FIG. 8 illustrates one embodiment of Layer 4 cells of a hierarchical network in accordance with an embodiment of the present invention.

Therefore, if Layer 1 uses 2.304 mbps then layer 2 uses 12,000 bps/group×24groups/cell×2slots=0.56 mbps Each succeeding higher layer is similarly constructed with the hubs of the preceding lower layer transmitting to a corresponding higher layer hub. A portion of Layer 3 is illustrated in FIG. 7 and a portion of Layer 4 is illustrated in FIG. 8.

In the present embodiment, the amount of data to be transmitted from a hub at one layer to a hub at the next layer is four times the data per hub in the lower layer. For example, in the above-described embodiment, data for 96 geophone groups is represented at each Layer 2 hub versus the 24 groups communicated in each Layer 1 hub to a Layer 2 hub. The data rate for this level and for this example is 12,000 bps/group×24groups/cell×2slots×4hubs=2.304 mbps For a Layer 2 hub to a Layer 3 hub the data rate requirements would be 4×2.304 mbps=9.216 mbps/time slot, frequency or code as each Layer 2 hub has to pass on data for 384 groups and this is accomplished with 2 frequencies, 2 time slots or 2 codes.

The layers can be extended upward until the final hub is co-located with the central recording system. Alternately, the layers can continue until a determined level is reached and alternate connections, e.g., cable, wireless, magnetic/optical media, or the like, are used to communicate the data to the central recording system. Using a completely wireless design based on the above principles and using currently available radios with real bandwidth available in the unlicensed frequency bands of 2.4 GHz and 5.8 GHz, approximately 30,000 geophone channels can be accommodated.

It is further contemplated that a hybrid system of cells and cables can be used wherein some hubs are connected via cables while other hubs are connected via the cell radio connections. This type of hybrid system can accommodate even more geophone channels. Furthermore, it is contemplated that in some instances the frequencies or time slots allocated for data transmission may be used to provide a repeater function where needed in view of survey conditions. In other instances cables can be used to tie one or more geophone groups to a hub or to another transceiver which would be a relay to the hub.

The hubs may be specially configured devices or measurement devices, e.g., geophones with radio transceivers to transmit and/or receive data on one or more frequencies. In one embodiment, geophones are organized into groups (e.g., 205, 210, 215, FIG. 2) or strings with one geophone designated as a group data collector. For example, each group data collector includes transmitter circuitry to transmit the collected data to the Layer 1 hub. There may also be geophone or other measurement devices that further includes radio receiver circuitry and transmitter circuitry to receive the transmissions from corresponding groups and transmit the collected data received to a higher layer hub. Similarly, higher layer hubs may include geophones configured with the necessary radio circuitry to perform the functions described herein.

Figure 9:
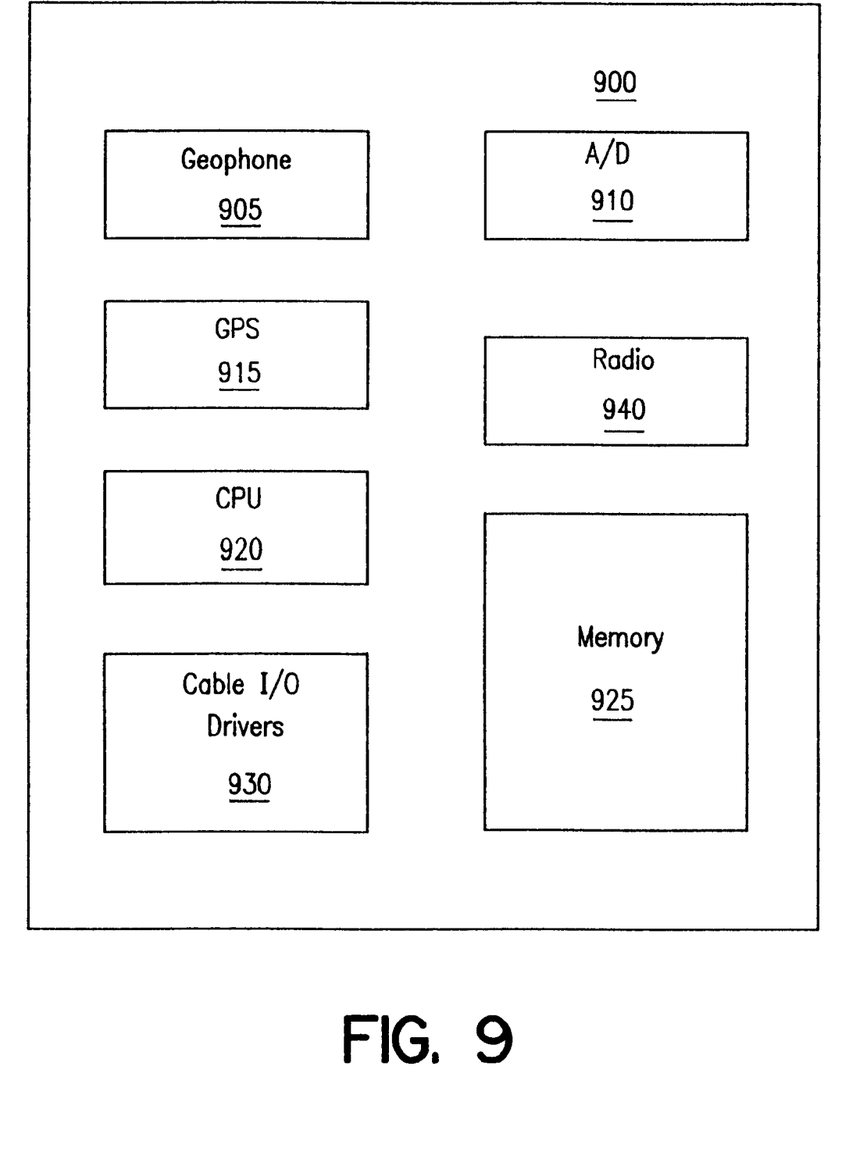
FIG. 9 illustrates one embodiment of a measurement device that operates in accordance with the teachings of the present invention.

A simplified block diagram of one embodiment of a measurement device 900 that operates in accordance with the teachings of the present invention is shown in FIG. 9. The measurement device 900 includes measurement circuitry 905 to collect data. For example, for seismic survey measurements, the measurement circuitry 905 is a geophone. In the present embodiment, Analog to Digital (A/D) converter 910 converts the measurement data into digital data for subsequent temporary storage and transmission. Cable input/output (I/O) drivers 930 interface to the cabled measurement devices of the group to collect data from other measurement devices of the group. Memory 925 functions to provide temporary storage of data as well as stored code that is executed by central processing unit (CPU) 920. CPU 920 provides the central control functions to operate the device 900 including the radio unit 940 used to transmit data, and if functioning as a higher layer hub, receive data.

Positioning receiver 915, preferably implemented as a Global Positioning System (GPS) receiver, receives positioning and time signals to determine the location of the measurement device 900. This position and time information can be used to tag the data collected with a time and position identification. The time information can be used to determine the time to transmit and to receive in a TDMA implementation. Furthermore, the position information may be used to enable automatic configuration of the measurement device 900 for the configured cell layers. For example, in one embodiment, a map of the cell layers is downloaded to the device 900. The system, e.g., CPU 920 executing software stored in memory 925, reviews the map information in view of its position identified by the GPS receiver 915 and determines the location or address of its assigned Level 1 hub and applicable higher layer cells and further identifies frequencies, time slots and/or codes at which data is transmitted in a particular direction. Other embodiments of auto configuration are also contemplated. For example, the GPS position may be directly transmitted back to a central site and the site transmits configuration information to the device 900 indicating frequencies and/or time slots and directions to transmit data in accordance with the cell layers.

Figure 10:
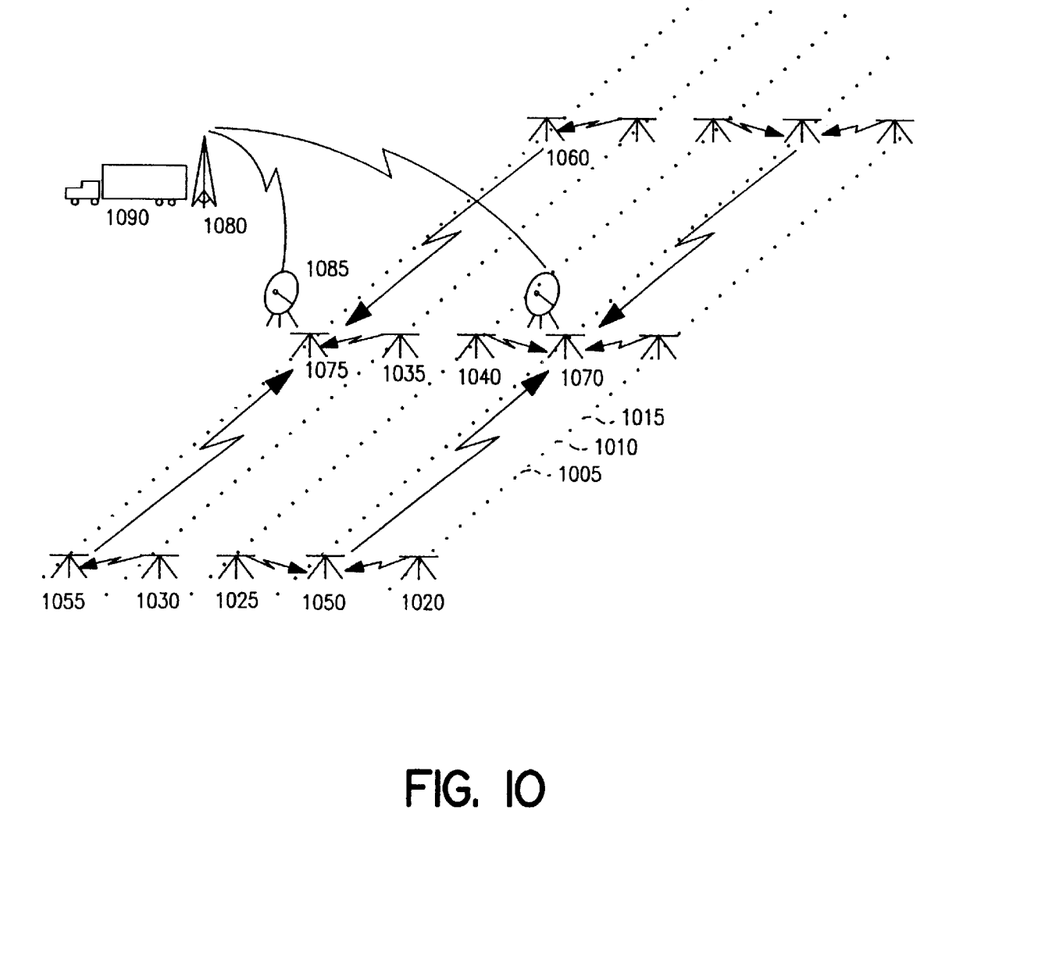
FIG. 10 illustrates one embodiment of a hierarchical network where rectangular cells are used.

FIG. 10 illustrates one embodiment of a hierarchical network where rectangular cells are used. Channel boxes (1005, 1010, 1015) communicate with Layer 1 hubs (1020, 1025, 1030, 1035, 1040). Layer 1 hubs in turn communicate with Layer 2 hubs (1050, 1055, 1060) which in turn communicate with Layer 3 hubs (1070, 1075). Layer 1 and 2 hubs use 2.4 GHz radios while Layer 3 hubs use both 2.4 and 5.8 (1085) GHz radios. Layer 3 hubs communicate to their terminal at antenna tower 1080 (e.g., via antennas 1085) which is connected to recording truck 1090.

The invention has been described in conjunction with certain illustrated embodiments. It is evident that numerous alternatives, modifications, variations and uses will be apparent to those skilled in the art in light of the foregoing description.

What is claimed is:

1. A survey system comprising:
   a plurality of measurement devices spatially separated about a survey area to be surveyed, each measurement device being associated with a transmitter;
   a first level network of cells, each cell covering a corresponding first level area of the survey area, each cell comprising a first level transceiver to receive transmitted data from at least some of the plurality of measurement devices located within the corresponding first level area and to transmit the received data; and
   at least one higher level network of cells, each higher level network comprising an area superposing over areas covered by lower level networks of cells and configured to receive data transmitted from the corresponding lower level networks of cells.

2. The survey system as set forth in claim 1, further comprising a central collection device coupled to receive data transmitted by a highest level network of cells of the at least one higher level network of cells.

3. The survey system as set forth in claim 1, wherein the transmitters are unidirectional.

4. The survey system as set forth in claim 1, wherein the first level area comprises sectors, the transmissions from measurement devices multiplexed according to the sector the measurement device is located in.

5. The survey system as set forth in claim 1, wherein the transmissions are time division multiplexed.

6. The survey system as set forth in claim 1, wherein the transmissions are frequency division multiplexed.

7. The survey system as set forth in claim 1, wherein the transmissions are code division multiplexed.

8. The survey system as set forth in claim 1, wherein the cell areas are hexagonal in shape.

9. The survey system as set forth in claim 8, wherein a second level of cells of the at least one higher level network of cells is configured to receive data transmissions of 3 cells of the first level network of cells.

10. The survey system as set forth in claim 8, wherein a second level of cells covers a second level area corresponding to seven cells of the first level network, wherein each second level cell is configured to receive data from three cells of the first level network.

11. The survey system as set forth in claim 2, wherein the coupling is a wireless.

12. The survey system as set forth in claim 2, wherein the coupling is wired.

13. The survey system as set forth in claim 2, wherein the coupling is optical.

14. The survey system as set forth in claim 8, wherein the cell areas are rectangular.

15. A method for collecting survey data from measurement devices located in a survey area, said method comprising the steps of:
   identifying a first level network of cells, each cell covering a corresponding first level area of the survey area;
   measurement devices located within a cell area transmitting data to a corresponding first level cell transceiver; and
   said first level cell transceivers within a second level cell of a second level cell network superposed over areas covered by the first level network transmitting to second level cell transceivers.

16. The method as set forth in claim 15, further comprising the step of:
   higher level cell transceivers of higher level cell networks superposed over areas covered by lower level cell networks receiving transmissions from a lower level cell network.

17. The method as set forth in claim 15, further comprising the step of a central data collection device receiving data transmitted by a highest level cell network of the higher level cell networks.

18. The method as set forth in claim 15, wherein transmissions are time division multiplexed.

19. The method as set forth in claim 15, wherein transmissions are frequency division multiplexed.

20. The method as set forth in claim 15, wherein transmissions are code division multiplexed.

* * * * *